United States Patent [19]

Enomoto et al.

[11] Patent Number: 4,908,698

[45] Date of Patent: Mar. 13, 1990

[54] COLOR PICTURE IMAGE PROCESSING SYSTEM FOR SEPARATING COLOR PICTURE IMAGE INTO PIXELS

[75] Inventors: Hajime Enomoto, Funabashi; Isao Miyamura, Niigata, both of Japan

[73] Assignee: Fujitsu Limited, Kawasaki, Japan

[21] Appl. No.: 199,357

[22] Filed: May 26, 1988

[30] Foreign Application Priority Data

May 29, 1987 [JP] Japan .................. 62-133690
Feb. 22, 1988 [JP] Japan .................. 63-39284

[51] Int. Cl.$^4$ ............................ H04N 11/04
[52] U.S. Cl. ................................... 358/13
[58] Field of Search ........................ 358/12, 13

[56] References Cited

U.S. PATENT DOCUMENTS

| | | | |
|---|---|---|---|
| 2,920,131 | 1/1960 | Valensi | 358/13 |
| 3,860,953 | 1/1975 | Cutler et al. | 358/13 |
| 4,141,034 | 2/1979 | Netravali et al. | 358/13 |
| 4,500,919 | 2/1985 | Schreiber | 358/80 |
| 4,816,901 | 3/1989 | Music et al. | 358/13 |

FOREIGN PATENT DOCUMENTS

| | | | |
|---|---|---|---|
| 213190 | 10/1985 | Japan | 358/12 |
| 863604 | 3/1961 | United Kingdom | 358/12 |

*Primary Examiner*—John W. Shepperd
*Attorney, Agent, or Firm*—Staas & Halsey

[57] ABSTRACT

A color picture image processing system with edge detection for separating a color picture image into pixel data, transmitting vector signals constituting chrominance components of the pixel data in a corresponding relationship with a transmission of scalar signals corresponding to luminance components of the pixel data, and reproducing the color picture image from the transmitted vector signals and scalar signals. The system includes: a calculation processing unit for separating chrominance components of the pixel data constituting the color picture image into lamellar components and vortex components, a lamellar vector analysis connecting unit for generating divergence components representing the lamellar components separated in the calculation processing unit in the form of a differentiation and carrying out edge formation, a vortex vector analysis connecting unit for generating rotation components representing the vortex components separated in the calculation processing unit in the form of a differentiation, and an edge extracting unit for comparing at least one of the output of the lamellar vector analysis connecting unit and the output of the vortex vector analysis connecting unit with a predetermined value and carrying out a detection of an edge of the color picture image based on the result of the comparison.

4 Claims, 14 Drawing Sheets

CONTINUING DISTRIBUTION OF CHROMINANCE VECTORS FOR CONTINUING PIXELS

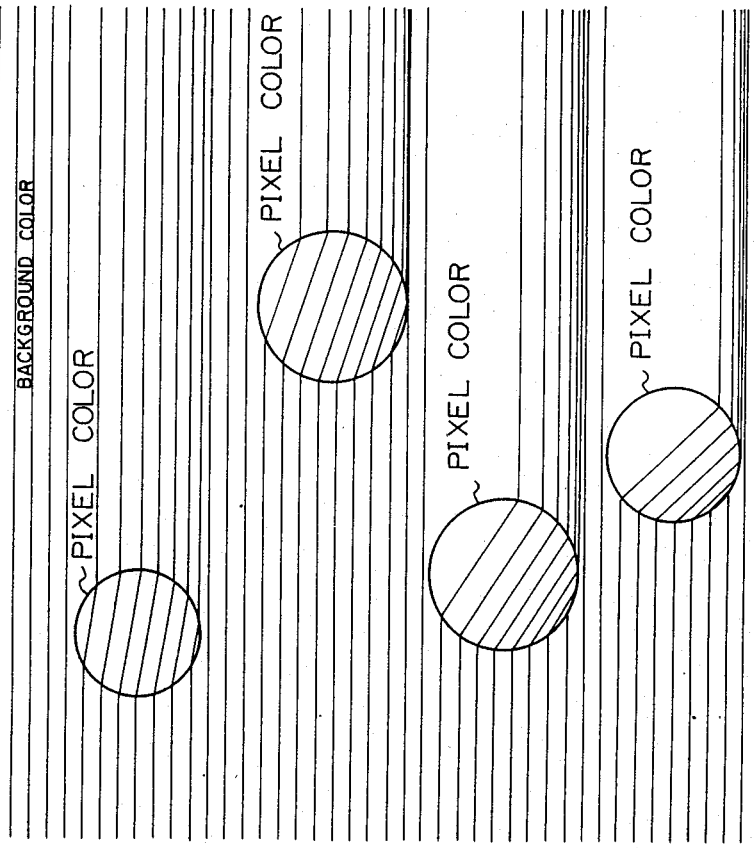
Fig. IC

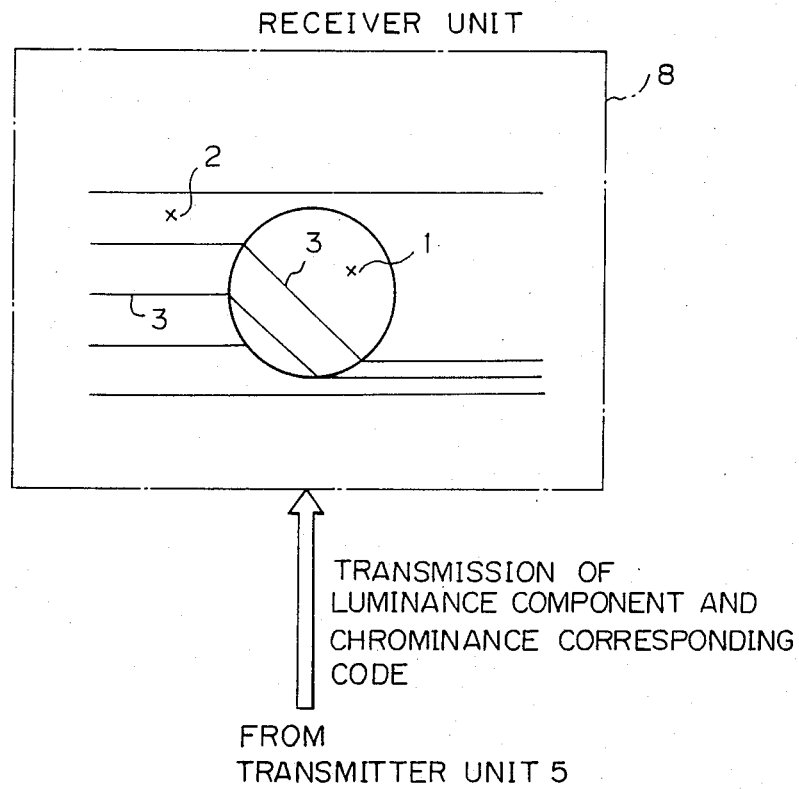

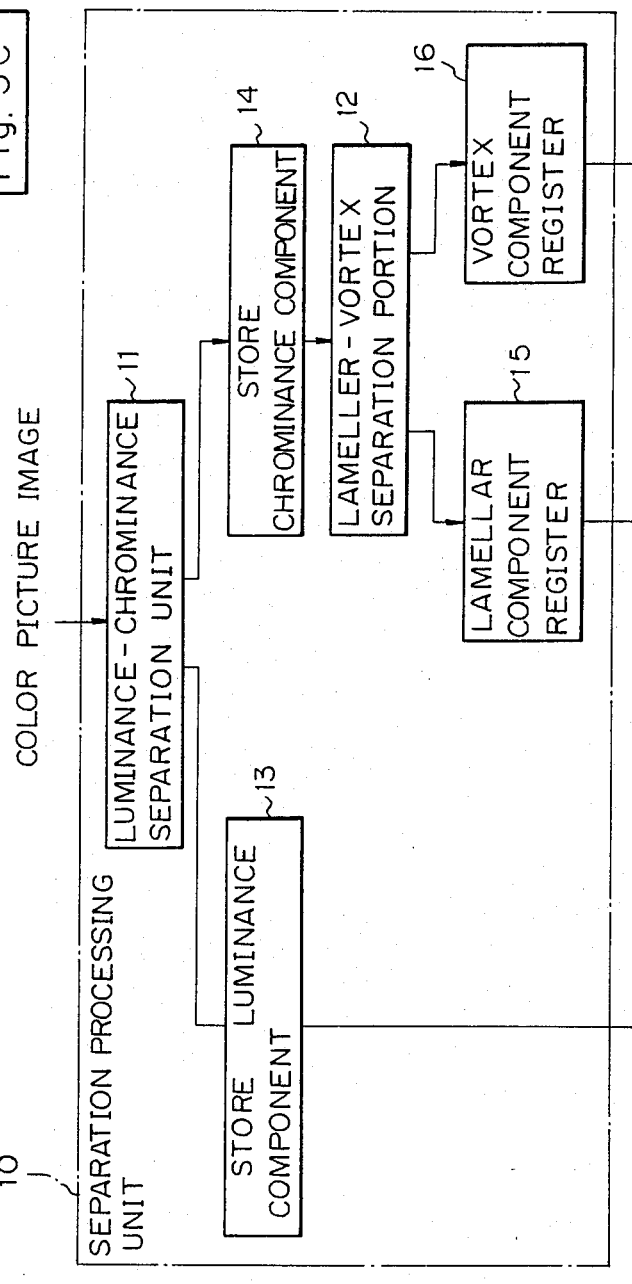

COLOR PICTURE IMAGE PROCESSING SYSTEM FOR SEPARATING COLOR PICTURE IMAGE INTO PIXELS

BACKGROUND OF THE INVENTION

1. Field of the Invention

The present invention relates to a processing system for transmitting a color picture, and more particularly to a processing system for decomposing a chrominance component into a lamellar (or laminar) component and a vortex component for transmitting a vector signal.

2. Description of the Related Art

When transmitting and reproducing color pictures as shown in a television transmission, conventionally a luminance component and a chrominance component are transmitted in response to a picture element on a color picture.

For example, assuming that three primary colors, Red (R), Green (G), and Blue (B), are used, the following signals Y, I, and Q are transmitted, in particular, the above-noted I and Q are transmitted on a sub-carrier.

In a NTSC system, a luminance Y is expressed as follows:

$$Y = 0.2988G + 0.5868G + 0.1144B$$

For a chrominance vector including I and Q, the signals I and Q are expressed as follows, respectively;

$$I = 0.736(R-Y) - 0.286(B-Y)$$

$$Q = 0.478(R-Y) + 0.413(B-Y)$$

In the prior art, the transmission of color pictures is carried out by the above-described method as an example, and in this case, the above-noted chrominance signal (that is, a signal on a chrominance component) bears a comparatively high energy component. Therefore, it would be advantageous if it were possible to reduce the energy of the above-noted chrominance signal. The present invention provides a new color picture coding system of compressing the transmission bandwidth and performing chrominance signal processing of information with good results.

THE INVENTION

An object of the present invention is to provide a color picture edge detection system for separating a chrominance component into a lamellar component and a vortex component and detecting the edge of color picture images from the separated chrominance component.

In accordance with the present invention, there is provided a color picture image processing system for separating a color picture image into pixels, transmitting vector signals constituting chrominance components of pixel data in a corresponding relationship with a transmission of scalar signals corresponding to luminance components of the pixel data, and reproducing the color picture image from the transmitted vector signals and scalar signals. The system includes a separation processing means for separating the color picture image into luminance components and chrominance components in correspondence with the pixels, and separating the separated chrominance components into vector potential components and scalar potential components, a coding processing means operating in response to the output of the separation processing means for generating luminance information corresponding to the luminance component and chrominance corresponding coding information based on the coding of all of the scalar potential components, and a synthesis processing means operating in response to the transmitted luminance information and the chrominance corresponding coding information for synthesizing the color picture image.

According to the present invention, as another feature of the invention, there is provided a color picture image processing system for separating a color picture image into pixels, transmitting vector signals constituting chrominance components of pixel data in corresponding relationship with a transmission of scalar signals corresponding to luminance components of the pixel data, and reproducing the color picture image from the transmitted vector signals and scalar signals. The system includes: a separation processing means for separating the color picture image into luminance components and chrominance components in correspondence with the pixels, and separating the separated chrominance components into vector potential components and scalar potential components, a coding processing means operating in response to the output of the separation processing means for generating luminance information corresponding to the luminance component and chrominance corresponding coding information based on the coding of all of the vector potential components and the scalar potential components, and a synthesis processing means operating in response to the transmitted luminance information and the chrominance corresponding coding information for synthesizing the color picture image.

According to the present invention, as still another feature of the invention, there is provided a color picture image processing system with edge detection for separating a color picture image into pixels, transmitting vector signals constituting chrominance components of pixel data in a corresponding relationship with a transmission of scalar signals corresponding to luminance components of the pixel data, and reproducing the color picture image from the transmitted vector signals and scalar system includes a calculation processing means for separating chrominance components of pixels constituting the color picture image into lamellar components and vortex components, lamellar vector analysis connecting means for generating divergence components representing the lamellar components separated in the calculation processing means in the form of differentiation, and carrying out edge formation, a vortex vector analysis connecting means for generating rotation components representing the vortex components separated in the calculation processing means in the form of a differentiation, and an edge extracting means for comparing at least one of the output of the lamellar vector analysis connecting means and the output of the vortex vector analysis connecting means with a predetermined value and carrying out a detection of the edge of the color picture image based on the result of the comparison.

BRIEF DESCRIPTION OF THE DRAWINGS

In the drawings:

FIGS. 1A to 1C illustrate the nature and distribution of chrominance vectors as a basis of the system of the present invention;

FIGS. 2, 3, and 4 illustrate the principle of the separation of a chrominance component into a lamellar component and a vortex component;

FIGS. 5A, 5B and 5C are schematic block diagrams of a color picture image processing system in accordance with an embodiment of the present invention;

DESCRIPTION OF THE PREFERRED EMBODIMENTS

Figure 1A:
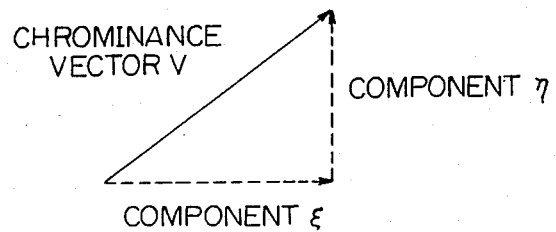

A chrominance component separated from a color picture is expressed as a vector V having vector components $\xi$ and $\eta$, as shown in FIG. 1A.

Figure 1B:
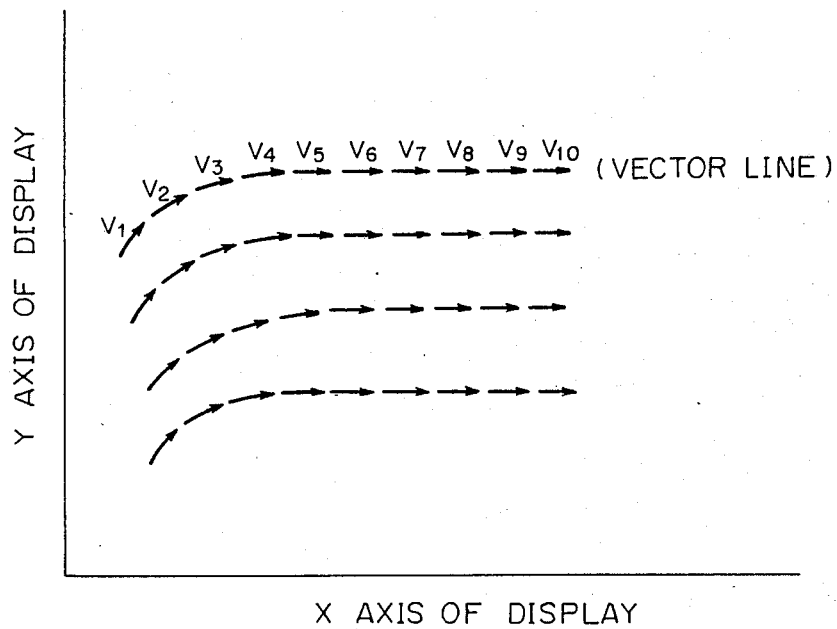

On a display plane, when the pixels of a picture are continuously arranged, the continuing distribution of chrominance vectors $V_1, V_2, V_3, \ldots$ corresponding to the pixels is represented as vector lines, as shown in FIG. 1B.

When a plurality of pixels of different colors are distributed in a background color, the distribution of chrominance vector lines is as in a pattern shown in FIG. 1C.

Figure 2:
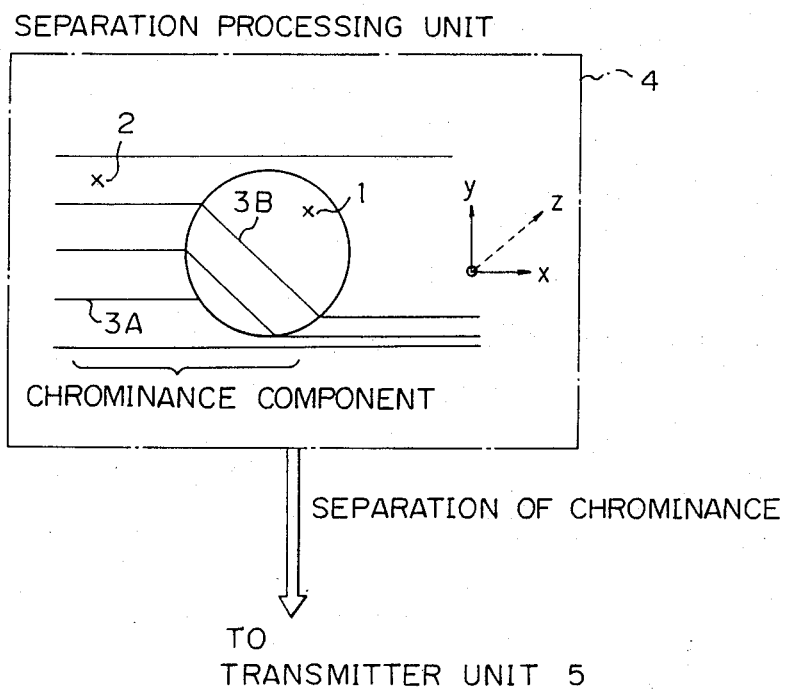

FIG. 2 shows an example of vector lines obtained from a schematic image of a color varying disk. Reference numeral 1 denotes a disk portion of an arbitrary color forming a given color picture, and 2 a background part of a different color forming a color picture. Reference 3A in a vector line 3 denotes a rectilinear portion extending in a horizontal direction, which shows that a certain background color is provided at the background part 2; 3B denotes a vector line 3, which is a rectilinear portion extending in an inclined direction and which shows that a color different from the background color is provided in a circular plate portion 1. 4 is a separation processing unit in which a given color picture is separated into a luminance component and a chrominance component, and further, the chrominance component is decomposed into a lamellar component and a vortex component, as will be described hereinafter.

Figure 3:
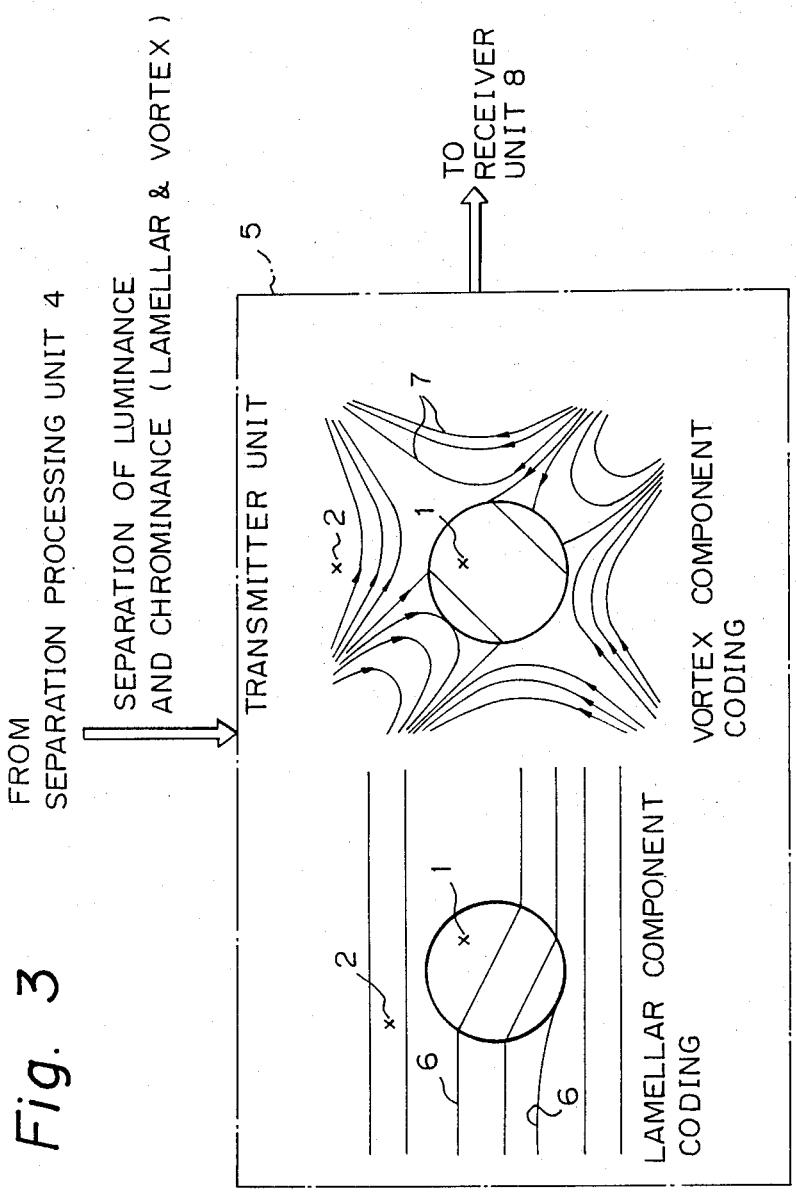

Reference numeral 5 denotes a transmitter unit in which each lamellar component and each vortex component is coded to obtain a chrominance corresponding code, and the information transformed from the luminance component can be transmitted together therewith. In FIG. 3, 6 denotes a line segment representing a lamellar component and 7 a line segment representing a vortex component.

Reference numeral 8 is a receiver unit in which an original color picture is composed by the abovedescribed luminance component and chrominance corresponding code.

The mode of operation in accordance with the present invention will be described as follows.

As described above, the chrominance component, by which a color picture is decomposed into a luminance component and a chrominance component and is obtained therefrom, is given by a vector signal. For example, in the NTSC broadcasting system for television transmission the above-noted vector V is represented as a vector having components I and Q.

In general, a chrominance component can be represented by a vector V, and the vector V is expressed as, $$V = \begin{bmatrix} \xi \\ \eta \end{bmatrix}.$$

If Helmholtz's formula is applied to this vector expression, the following formula is obtained.

$$V = \text{grad } L + \text{rot}(R \cdot k) \tag{1}$$

where L and R are functions to be decided and k is a unit vector on the Z-axis.

The formula (1) is represented by the following expression $$V = \begin{bmatrix} \xi \\ \eta \end{bmatrix} = \begin{bmatrix} L_x \\ L_y \end{bmatrix} + \begin{bmatrix} R_y \\ -R_x \end{bmatrix}$$

where L is a scalar potential, R.k a vector potential in which the direction is represented by a unit vector k in a z-direction perpendicular to a space denoted in FIG. 2, $L_x = \partial L/\partial x$, $L_y = \partial L/\partial y$, $R_x = \partial R/\partial x$, and $R_y = \partial R/\partial y$.

When div V is operated with the above-noted vector V, the following is obtained, $$\begin{aligned} \text{div } V &= \text{div} \cdot \text{grad } L + \text{div} \cdot \text{rot } (R \cdot k) \\ &= \text{div} \cdot \text{grad } L \end{aligned}$$

and $$\xi_x + \eta_y = L_{xx} + L_{yy} \tag{2}$$

and when rot V is operated with the above-noted vector V, the following is obtained.

$$\text{rot } V = \text{rot} \cdot \text{rot } (R \cdot k)$$

and $$\xi_y - \eta_x = -(R_{xx} + R_{yy}) \tag{3}$$

where $\xi_x = \partial\xi/\partial x$, $\xi_y = \partial\xi/\partial y$, $\eta_x = \partial\eta/\partial x$, $\eta_y = \partial/\partial y$, $L_{xx} \partial^2 L/\partial x^2$, $L_{yy} = \partial^2 L/\partial y^2$, $R_{xx} \doteq \partial^2 R/\partial x^2$, and $R_{yy} = \partial^2/\partial y^2$.

The lefthand sides of the above-noted equations (2) and (3) can be measured, and thus if the equations (2) and (3) are resolved, L and R can be obtained.

L is a potential representing a laminar or a lamellar component, and as shown in FIG. 3, corresponds to a disk 1 of different colors arranged on a background 2, wherein L is represented by the lines 6. R is a potential showing a vortex or a vortex component and corresponding to the disk 1 arranged on the background 2, wherein R is represented by the lines 7.

When the luminance component and the above-noted lamellar component and vortex component are transmitted, an original color picture can be reproduced in a receiver unit 8, as shown in FIG. 4.

When a simulation experiment is carried out regarding a standard picture GIRL (a color picture of a Girl) defined by the Society of Motion Picture and Television Engineers (SMPTE), the energy of the above-noted R corresponding to the square of the amplitude of a signal is only 2.25 percent, in comparison with L. Therefore, if a signal is transmitted by omitting a vortex component responsive to the above-noted R or by using very little information, the original color picture can be reproduced with little deterioration of the picture quality.

Note, all of the above-noted vortex components may be transmitted. Both the coded lamellar component and the coded vortex component which omits a part of information as described above (including a case in which all of the information is omitted) or does not omit all of the information, are regarded as a chrominance corresponding code according to the present invention. Based on the transmitted luminance component and chrominance corresponding code, the original color picture is reproduced at the receiver unit 8 as shown in FIG. 4. Thus, in computer graphics, if an amount of information for a feature extraction is reduced, a faithful reproduction is obtained with little energy.

Figure 5B:
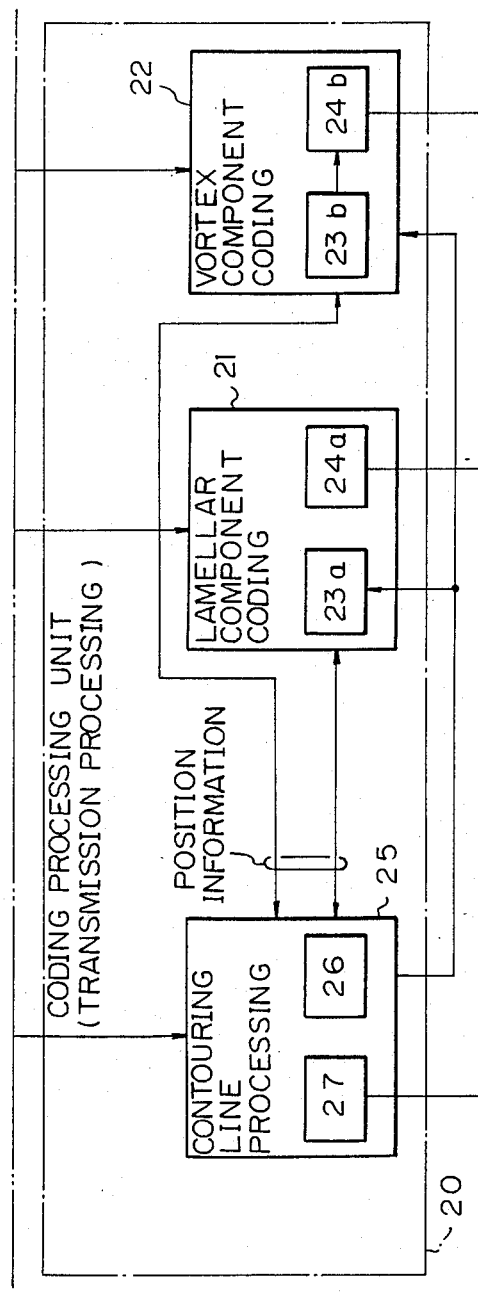
Figure 5C:
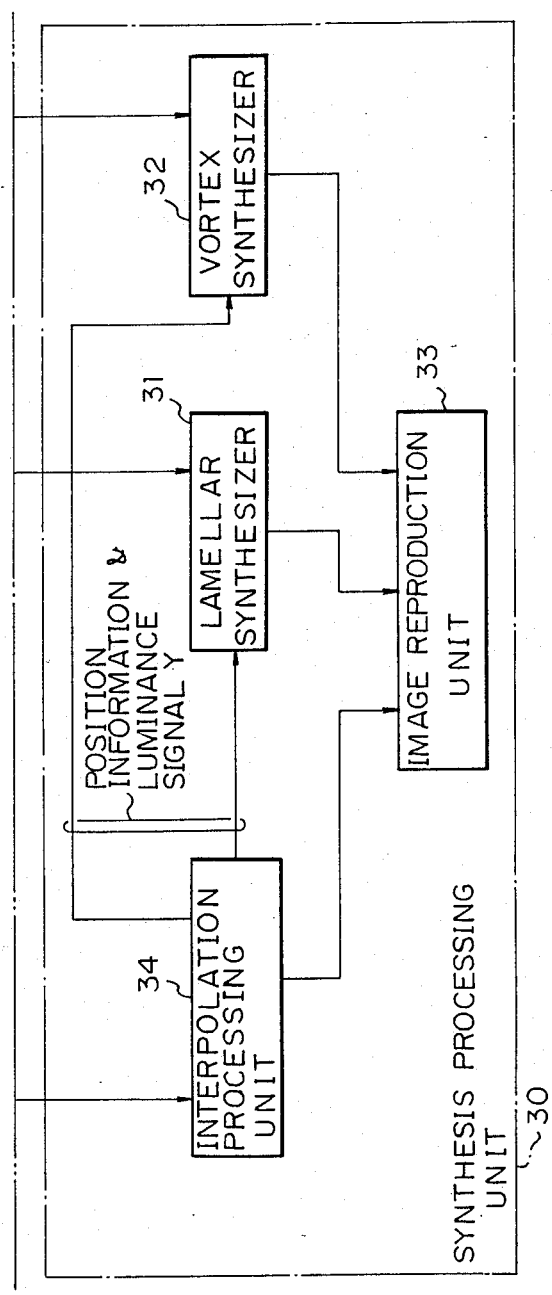

FIG. 5 is a block diagram of the transmission and processing system of the present invention.

In FIG. 5, reference numeral 10 denotes a separation processing unit which is the same as that shown in FIG. 2, 20 a coding processor portion which is contained in the transmitter unit 5 as shown in FIG. 3, and 30 a synthesis processing unit which is contained in the receiver unit 8 as shown in FIG. 4.

In the above-noted feature separation processing unit 10, reference numeral 11 denotes a luminancechrominance separation unit which separates a given color picture into a luminance component holding unit 13 and a chrominance component holding unit 14.

For the chrominance component 14, weighting is implemented based on a luminance signal Y, in place of the values-$\xi$ and $\eta$ represented by the above formula, where $$V = \begin{bmatrix} \xi \\ \eta \end{bmatrix},$$

and weighted chrominance components $\xi'$ and $\eta'$ should be employed. That is, it is better to use the following formulae $\xi' = \xi/[a + (1-a)Y]$ and $\eta' = \eta/[a + (1-a)Y]$, where a is a quantity which is biased so that a chrominance component vector may be uniform between 0 to $2\pi$ and is given by the relationship, $0 \leq a \leq 1$.

Reference numeral 12 denotes a lamellar-vortex separator portion which is separated into a lamellar component 15 and a vortex component 16.

Reference numeral 25 in the above-noted coding portion 20 denotes a contouring line processor portion wherein a contour or an edge of luminance obtained from the luminance component is extracted in advance and then utilized as position information, as described later.

Reference numeral 21 denotes a lamellar component coding portion and 22 a vortex component coding portion. Both the lamellar component coding portion 21 and vortex component coding portion 22 implement coding, and often the color contour or edge obtained from the chrominance component coincides with the contour of the above-noted luminance. In the course of coding, the position information obtained from the contour of the above-noted luminance is received from the contouring line or edge processing unit 25 and utilized to carry out positioning.

The luminance component and the above-noted chrominance corresponding code word are transmitted to the receiver portion 8 as shown in FIG. 4, and when the luminance component is transmitted, an interpolation processing is carried out at a synthesis processor portion 30 installed within the receiver portion 8. That is, regarding the luminance component to be transmitted, a luminance corresponding to all of the picture elements on a color picture often may be transmitted, but in general, if the two luminance components at the two positions selected by means of some criterion are transmitted, the luminance components existing between the selected two picture positions can be pursued by the interpolation method which criterion satisfies the continuity of luminance. Even when the luminance of all of the picture elements is transmitted, the interpolation may be carried out to restore, for example, luminance information lost in the course of transmission.

Reference numeral 34 denotes an interpolation processing portion which implements an interpolation processing, 31 a lamellar synthesizing portion, and 32 a vortex synthesizing portion. Note, when the above-noted chrominance corresponding code word is transmitted from the vortex component coding unit 22 in a form such that all of the vortex components are omitted, the processing in the vortex synthesizing portion 32 is also omitted. Further, the position information and luminance signal Y may be supplied from the interpolation processing portion 34, for the above-noted lamellar synthesizing portion 31 and vortex synthesizing portion 32. Therefore, an image reproducing portion 33 can reproduce the color picture, based on the already obtained luminance component signal, lamellar component and vortex component signal, and thus it is concluded that the transmission of the luminance component signal and the chrominance corresponding code can provide a color picture reproduction with a good efficiency and high fidelity.

The color picture edge detection system and transmission processing system thereof will be described hereinafter.

The basic requirement for geometrical modelling in computer graphics is the establishment of a concrete mutual relationship between actual three-dimensional objects and a displayed picture by a graphic system, and there is an urgent need for an image processing satisfying these requirements, in all scientific and industrial fields. An inherent purpose of geometrical modelling is an extraction of a set of features independent of an environment such as illumination or a small distortion.

Structure lines expressing the most primitive local geometrical features of pictures are introduced by the inventors.

In color graphics, the chrominance vector should be transformed into suitable scalar spaces: A flow model can be efficiently applied for this purpose.

The primitive features of a picture are the cusp points and edges. Edges are generated by boundaries of three-dimensional objects or patterns, and cusp points are extracted as cross points of edges. The features of an objects appear in a picture so as to produce a large difference in color or brightness, and desirably, color graphics can select these properties of feature generation.

Cusp points and edges give basic geometrical features and regions are constituted by a boundary edge. Note that the regions correspond to respective objects or elements of patterns.

For pictures, an expression scheme having good geometrical features should satisfy the following conditions:

(1) Every feature should be unchanged for a variation of environment where the picture represents an actual object.

(2) Feature structures are organized from primitive features.

(3) The features have almost independent properties.

(4) An average value of each feature over a local region indicates a physiological meaning.

These conditions give a mathematical structure of the features.

In general, the edge detection of a color picture is implemented by solving the equations of structure lines expressed as follows.

Structure lines for a scalar function $\phi$ (x, y) give primitive geometrical features satisfying the above-noted conditions, because the structure lines are defined by the following unchangeable formulae and cusp points are given by cross points of two edges defined by X and H. In this case, the luminance information of color pictures is used as a scalar function $\phi$ (x, y).

$$X(x, y) = \begin{bmatrix} \phi_x \\ \phi_y \end{bmatrix}, \quad X_\perp(x, y) = \begin{bmatrix} -\phi_y \\ \phi_x \end{bmatrix}$$

$$H(x, y) = \begin{bmatrix} \phi_{xx}, & \phi_{xy} \\ \phi_{yx}, & \phi_{yy} \end{bmatrix}$$

$C(x, y) = X^t H X_\perp = 0$: C-line $D(x, y) = X_\perp^t H X_\perp = 0$: D-line $E(x, y) = X^t H X = 0$: E-line $L(x, y) = \text{trace } H = 0$: L-line where $\phi_i = \dfrac{\partial \phi}{\partial i}$, $\phi_{ij} = \dfrac{\partial^2 \phi}{\partial i \partial j}$.

From the above equation, a ridge or valley line type edge is obtained from the C-line, a divisional line type edge from the D-line, and a step type edge is obtained from the E-line and L-line, respectively.

Figure 6:
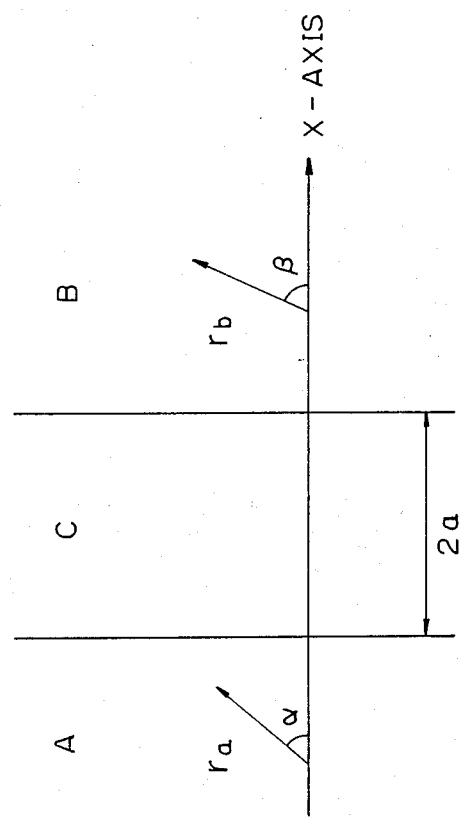
FIG. 6 is a diagram showing a step variation of the chrominance for the system of FIG. 5.

As another embodiment of the present invention, a color picture processing system using a color picture edge detection method will be described in detail with reference to FIGS. 5, 6 and 7.

In FIG. 5, reference numeral 10 denotes a feature separation processing unit constituted by a luminance-chrominance separation portion 11 which separates a luminance component and a chrominance component possessed by a picture element forming a color picture, and an operation or calculation processing portion 12 for separating a chrominance component separated by the luminance-chrominance separation portion 11 into a lamellar component and a vortex component by applying the Helmholtz theorem.

In the portion 14, the chrominance vector is separated and the chrominance components are held or stored. These components are values of $-[\xi, \partial]$ in pixels and expressed as a matrix as follows:

$$\ldots \begin{bmatrix} \xi_{i,j-1} \\ \eta_{i,j-1} \end{bmatrix} \ldots \begin{bmatrix} \xi_{i-1,j} \\ \eta_{i-1,j} \end{bmatrix}, \begin{bmatrix} \xi_{i,j} \\ \eta_{i,j} \end{bmatrix}, \begin{bmatrix} \xi_{i+1,j} \\ \eta_{i+1,j} \end{bmatrix} \ldots \begin{bmatrix} \xi_{i,j+1} \\ \eta_{i,j+1} \end{bmatrix} \ldots$$

Figure 7A:
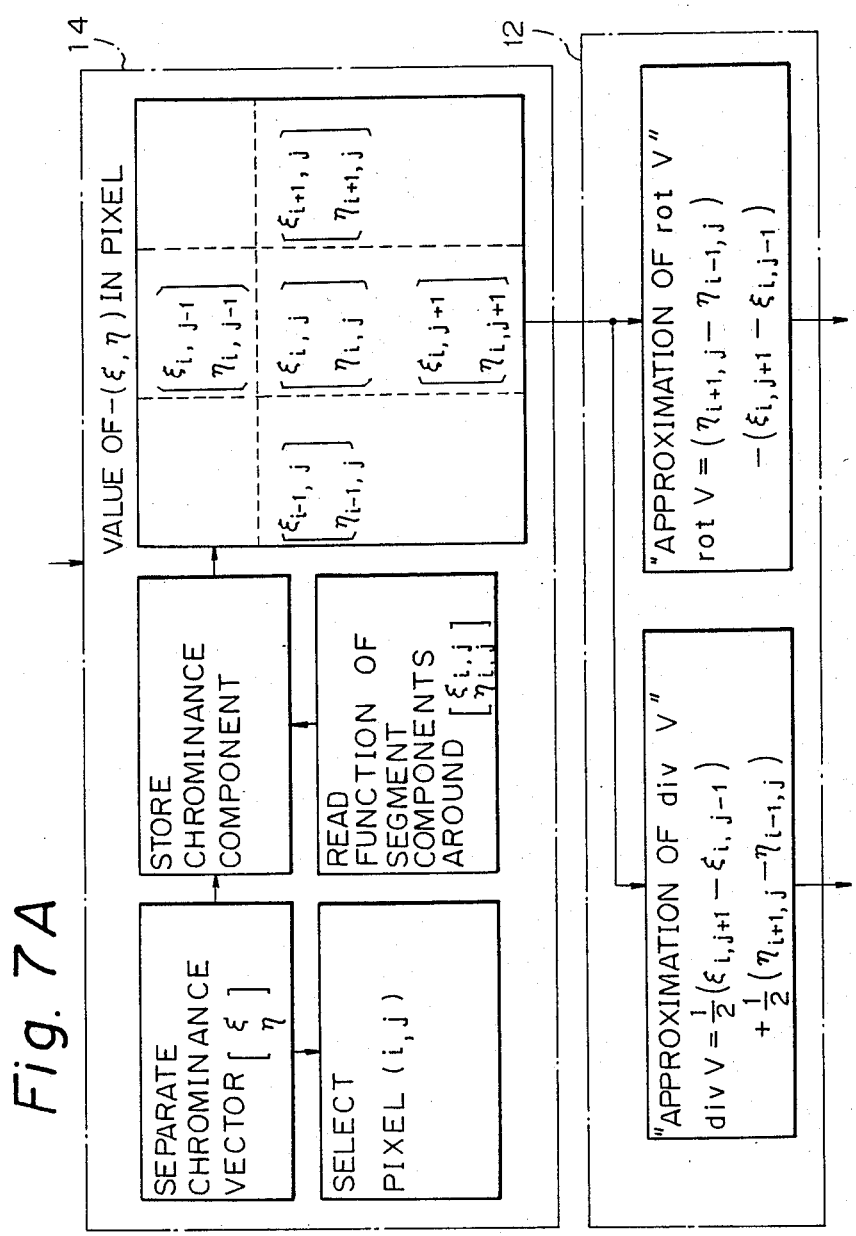
FIGS. 7A and 7B are schematic block diagrams shows an example of the structures of a lamellar-vortex separation unit, a chrominance component holding unit, a lamellar component holding unit, and a vortex component holding unit in the system of FIG. 5.
Figure 7B:
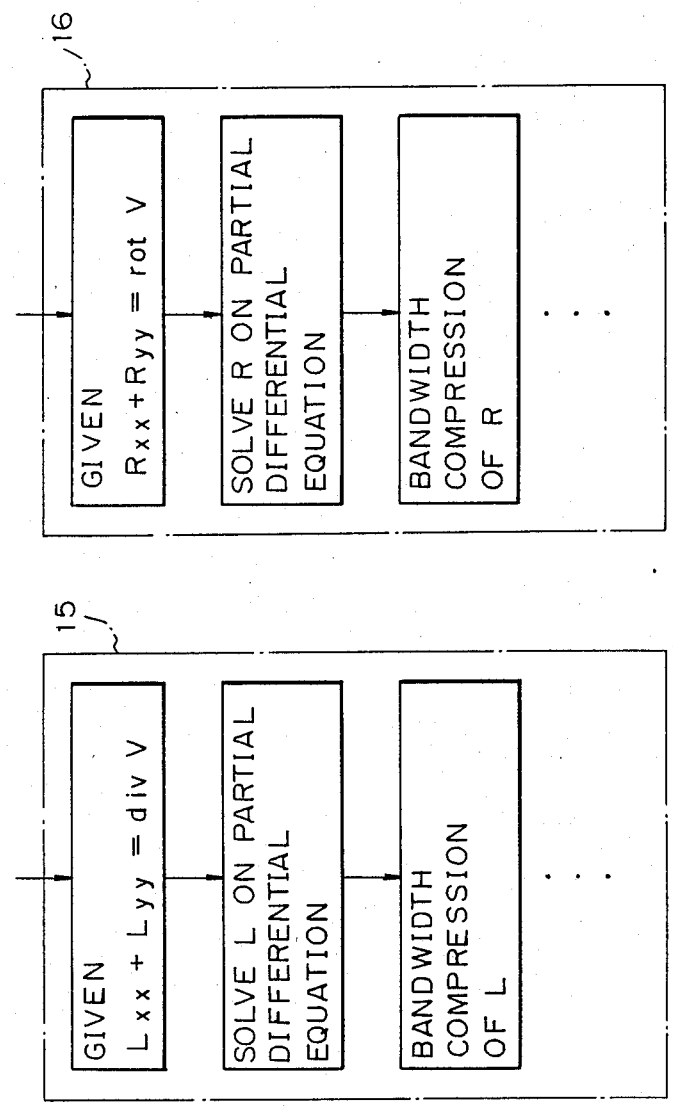
Figure 8:
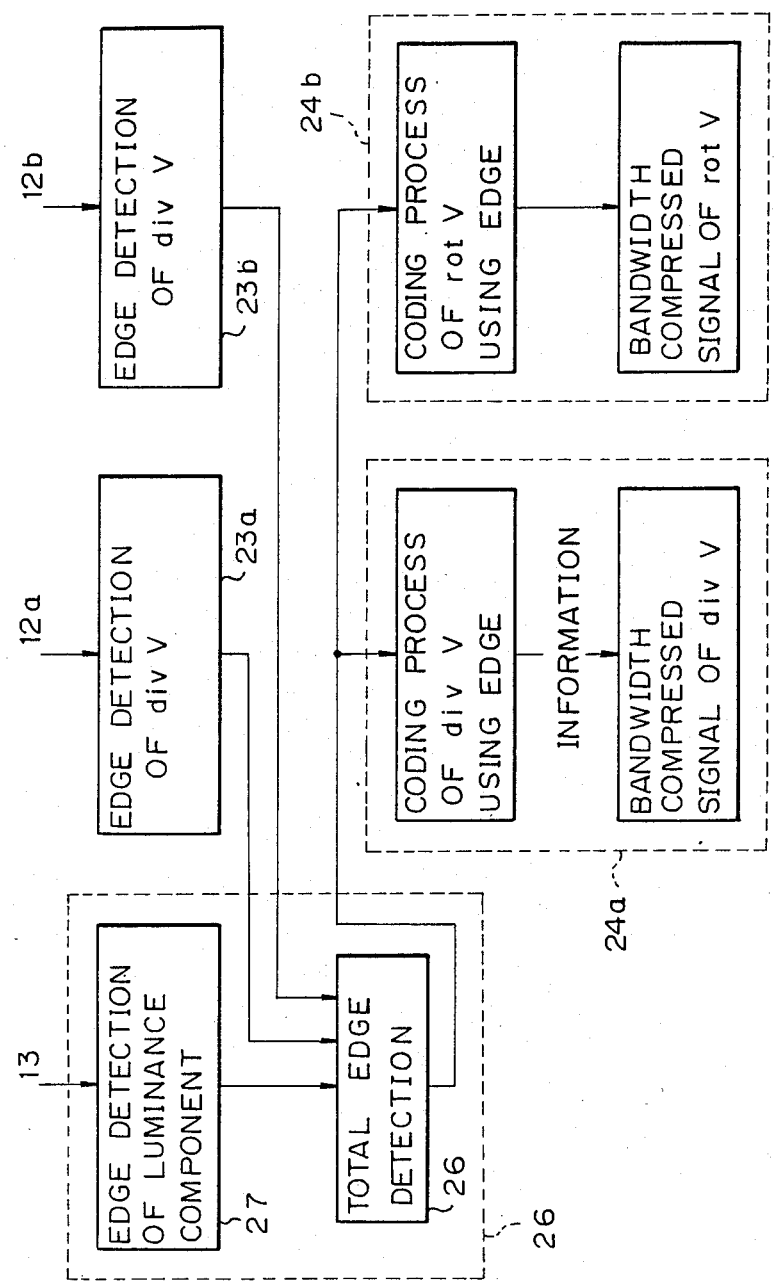
FIG. 8 shows an example of the structures of a lamellar vector analysis connecting unit, a vortex vector analysis connecting unit, a lamellar coding processing unit, a vortex coding processing unit, and an edge processing unit in the system of FIG. 5.

From the above matrix value, an approximation of div V and rot V is obtained in 12, respectively, as shown in FIG. 7. After the chrominance vector is separated, the matrix element (i,j) of pixels is selected. The function of segment components around $$\begin{bmatrix} \xi_{i,j} \\ \eta_{i,j} \end{bmatrix}$$

are read and the chrominance component is held.

In a lamellar component register 15, and a vortex component register 16, if the equation $$L_{xx} + L_{yy} = \text{div } V$$

is given, the partial differential equations on L and R are solved and then, a bandwidth compression of L and R is carried out to synthesize it. After the synthesis operation an original picture is reproduced to restore it.

Reference numeral 20 denotes a transmission processing unit and is constituted by a lamellar transmission processing unit 21, a vortex transmission processing unit 22, and a contouring line processing unit 25. The lamellar transmission processing unit 21 is formed by a lamellar vector analysis connecting unit 23a and a lamellar coding processing unit 24a. The lamellar vector analysis connecting unit 23a outputs a divergence component which represents the lamellar component separated from the operation processing unit 12 as a derivative, to carry out an edge operation. The lamellar coding processing unit 24a makes both an output of a divergence component in the lamellar vector analysis connecting unit 23a and a lamellar component separated from the operation processing unit 12 carry out a bandwidth compression for coding.

The vortex transmission processing unit 22 is formed by a vortex vector analysis connecting unit 23b and a vortex coding processing unit 24b. The vortex vector analysis connecting unit 23b carries out an edge operation of the output which represents the vortex component separated from the operation processing unit 12, as a derivative. The vortex coding processing unit 24b makes both the vortex component separated from the operation processing unit 12 and a rotation component output of the vortex vector analysis connecting unit 23b carry out a bandwidth compression for coding.

The contouring line processing unit 25 is formed by an edge extraction unit 26 and a luminance edge extraction unit 27. The edge extraction unit 26 compares the output value of either or both outputs among a lamellar vector analysis connecting unit 23a and a vortex vector analysis connecting unit 23b with a predetermined reference value, to detect the edge of the color picture. The luminance edge extraction unit 27 detects the edge of the color picture based on the luminance component separated from the luminance/chrominance separation unit 11.

In a portion 13 of FIG. 5, the luminance component of the separation unit 11 is held. The output of the portion 13 is sent to a contouring line processing unit 25 and the edge of the luminance component is detected at a portion 27 and then a total edge detection is carried out at a portion 26 by the joint operation of an edge detection of div V from portions 23a and 23b. The output of the portion 26 is sent to portions 24a and 24b and the coding process of div V and rot V using the edge is carried out and the bandwidth compressed signals of div V and rot V are obtained.

Reference numeral 30 denotes a synthesis processing unit which receives code information from the lamellar coding processing unit 24a and a vortex coding processing unit 24b, and contouring line information from the contouring line processing unit 25, to synthesize the image of a color picture.

In accordance with the present invention, the divergence component output, which represents a lamellar component output by the lamellar vector analysis connecting unit 23a as a derivative, and the rotation component output, which represents a vortex component output by the vortex vector analysis connecting unit 23b as a derivative, take a large absolute value other than zero in the vicinity of an edge of a color picture caused by the difference of chrominance value, in a different way from places other than the edge. Therefore, if a divergence component output of the lamellar vector analysis connecting unit 23a and a rotation component output of the vortex vector analysis connecting unit 23b at the edge extraction unit 26 are compared with a predetermined reference value, it is seen that the edge of a color picture can be detected. Therefore, even if there is no difference between the luminance values the edge where there is some difference in chrominance can be easily detected.

In this color picture edge detection system, when an edge detected by the luminance edge extraction portion 27 is added, the color picture edge detection is more reliably carried out.

Figure 9:
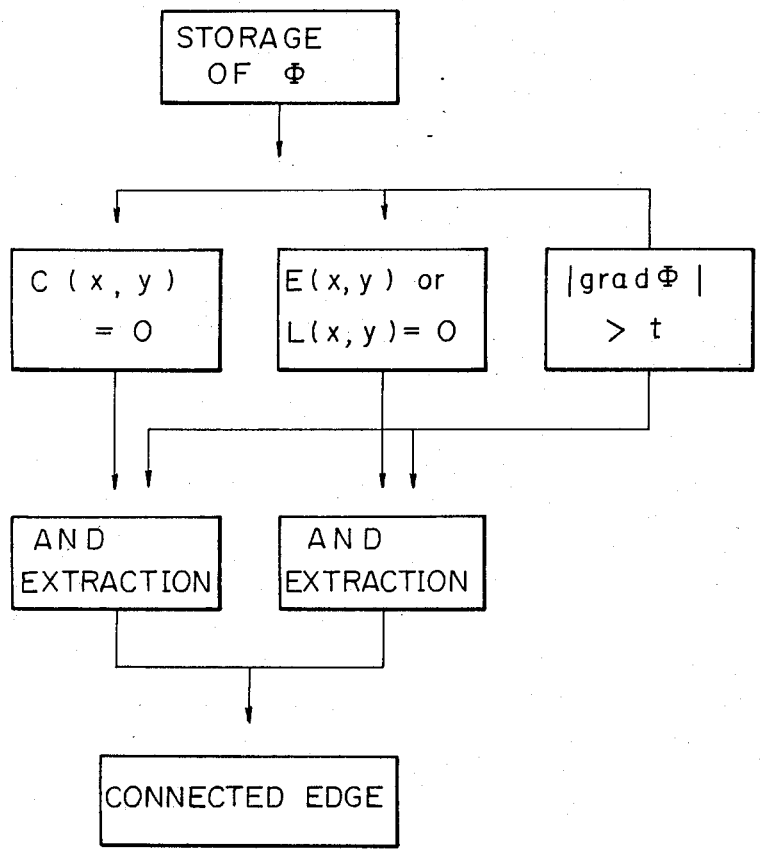
FIG. 9 shows an example of a process of the edge detection regarding a scalar function $\phi$ for the system of FIG. 5; and, FIG. 10 is a copy of a picture for showing the effect of the edge detection using the luminance and chrominance signal in the system of FIG. 5.

As described above, the luminance component, div V and rot V are represented by a scalar. FIG. 9 shows an example of a process of the edge detection regarding a scalar function $\phi$ for the system of FIG. 5.

If a roof edge function C (x,y) and a step edge function E (x,y) or L (x,y) is found with a scalar function $\phi$, a point is obtained by an analysis or condition that the value of one of these function C (x,y), E (x,y) or L (x,y) is equal to zero and an absolute value of grad $\phi$ viz., $|\text{grad } \phi|$ is larger than a certain threshold value t. Then after a connection, a required edge is found.

In the system as shown in FIG. 5, if a lamellar component and vortex component on a specified axis, a divergence component output of the lamellar component output by the lamellar vector analysis connecting unit 23a, and a rotation component output of the vortex component output by the vortex vector analysis connecting unit 23b, are encoded and transmitted to the synthesis procession portion 30, the chrominance component on the all axes in the synthesis processing unit 30 side can be synthesized. Then, since the divergence component output and the rotation component output are regarded as nearly zero in a place other than an edge, the bandwidth compression method on a monochrome picture can be applied thereto and attain a good result.

Decomposition of Color Features

When considering a luminance signal and chrominance signals for color images, since the luminance signal is represented as a scalar, it can be analyzed by concepts of structure lines. In order to apply the concept of feature described above, it is necessary to adopt a separation scheme for a chrominance vector, regardless of the selection of a color space system.

By using Helmholtz's theorem, a vector field $$V = \begin{bmatrix} \xi \\ \eta \end{bmatrix}$$

is divided into two components, which are lamellar and vortex components, and thus, $$V = \text{grad } L + \text{rot } R \cdot k \quad (11)$$

$$V = \begin{bmatrix} L_x \\ L_y \end{bmatrix} + \begin{bmatrix} R_x \\ -R_x \end{bmatrix}$$

where L (x, y) is a scalar potential and R (x, y)·k is a vector potential pointing Z-axis (k).

With respect to a vector V in the formula (11), divergence and rotation processing are carried out to obtain the following formulae:

$$\xi_x + \eta_y = L_{yy} \quad (12)$$

$$\xi_y - \eta_x = -(R_{xx} + R_{yy}) \quad (13)$$

The chrominance signal space can be represented by a set of vector lines generated by a continuation of a respective chrominance vector, and vector lines considered as a set of streamed lines. Therefore, a scalar potential represents a lamellar flow and a vector potential represents a vortex component.

The edge detection system of color pictures according to the system in FIG. 5 will be described with reference to FIG. 6.

Suppose that a region A and a region B having a separate chrominance vector respectively are continuously connected therewith through a region C having a width of 2a.

Now, suppose that a chrominance vector $V_A$ in a region A and a chrominance vector $V_B$ in a region B are given by the following formula $$V_A = \begin{bmatrix} r_a \cos \alpha \\ r_b \sin \alpha \end{bmatrix}, \quad V_B = \begin{bmatrix} r_a \cos \beta \\ r_b \sin \beta \end{bmatrix}$$

Then, if div V and rot V are found in such an edge portion, each of the following formulae can be found from a definition of div V, $$\text{div } V = \frac{\partial \xi}{\partial x} + \frac{\partial \eta}{\partial y} = \frac{1}{2a} \Delta \xi$$

$$= \frac{1}{2a} (r_b \cos \beta - r_a \cos \alpha)$$

and from a definition of rot V $$\text{rot } V = \frac{\partial \xi}{\partial y} - \frac{\partial \eta}{\partial x} = \frac{-1}{2a} \Delta \eta$$

$$= \frac{1}{2a}(r_b \cos \beta - r_a \sin \alpha)$$

It is apparent from the above formulae that |div V | | and rot V | show a larger value than zero in the vicinity of an edge of a color picture, and show nearly a zero value in a place other than in the vicinity of an edge.

Therefore, if a place is found where either or both indicates a value greater than a predetermined value, it is seen that an edge of a color picture can be extracted. As is apparent from the above-described formula, $$\xi_x \eta_y = L_{xx} + L_{yy} \quad (2),$$

a divergence operation is applied to the chrominance signal V directly to find |div V| as a derivative of the lamellar component 15, and |div V| is found, as is apparent from the above-described formula, $$\xi_y - \eta_x = -(R_{xx} R_{yy}) \quad (3),$$

a rotation (Rot) operation is applied to the chrominance signal V directly to find |rot V| therefrom. Accordingly, it is found that, regarding the edge extraction portion 26, by comparing a divergence component output of the lamellar vector analysis connector 23a and a rotation component output of the vortex vector analysis connector 23b with a predetermined reference value set to a nearly zero value, the edge of the color picture can be detected.

If the edge detection system in accordance with the present invention constituted in the above way is combined with a prior art edge detection system based on the luminance, a more accurate and more reliable edge detection system for a color picture will be obtained. Such a combination can enable a detection of the edge, with the exception of where there is no significant difference of the luminance itself, but there is a conspicuous difference of the chrominance, and the edge where there is no significant difference of the chrominance, but there is a conspicuous difference of the luminance.

A color picture transmission processing system will be now described as follows. The reason why the present invention separates a chrominance component 14 into a lamellar component 15 and a vortex component 16 is based on the intention that the reduction of energy possessed by the chrominance signal can lead to a compression of the transmission bandwidth. But since a specified feature exists wherein the |div V| and |rot V| represent a nearly zero value in a place other than in the vicinity of edge of the color picture, the application of the above-noted feature further makes the compression of the transmission band possible.

If the value of a vector $(\xi, \eta)$ of the chrominance component 14 along a specified X-axis of a color picture (that is, a lamellar component and vortex component) is provided at the transmission side, since $(\xi_x, \xi_x)$ is equal to the difference value of a vector $(\xi, \eta)$ between adjoining picture elements, the value $(\xi_x, \xi_x)$ can be easily found. Therefore, if the value of div V and rot V is given, $(\xi_y, \xi_y)$ can be easily found according to the above-noted formulae (2) and (3). From this reasoning, if the value of $(\xi, \eta)$ on the specified X-axis is an initial value and the difference equation of $(\xi_y, \eta_y)$ is solved, the $(\xi, \eta)$ on an X-axis adjoining the specified X-axis can be represented, and if the same processing is repeated, the $(\xi, \eta)$ over all the region of a color picture can be represented as shown in FIG. 7.

If the value of div V and rot V, and a very little value of a lamellar component 15 and a vortex component 16 are received at the receiving side, it is seen that the chrominance component 14 possessed by a color picture can be reproduced. Furthermore, as the picture represented by div V and rot V is a monochrome and indicates a zero value in nearly all regions of the color picture, if the picture is encoded and transmitted by the band compression of the monochrome picture (for example, gradient orthogonal transformation, cosine transformation or selective DPCM method), a precise color picture can be reproduced by a very small transmission quantity.

Figure 10:
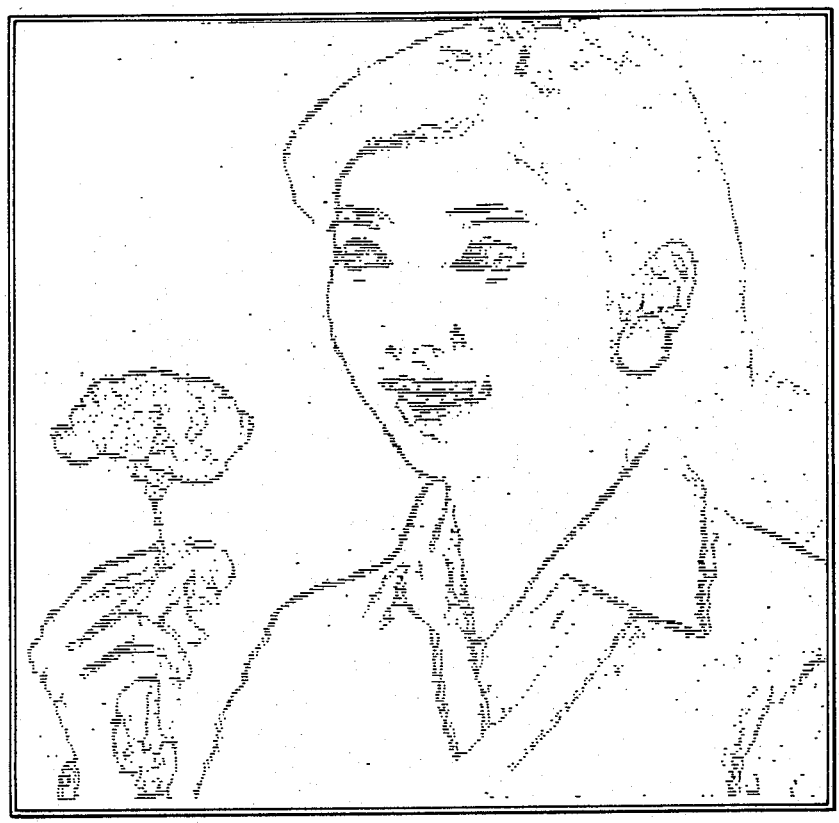

FIG. 10 shows a concrete example of an edge extracted from a standard color picture GIRL in accordance with an edge detection system of a color picture. This data edge detection system uses also the edge detection system based on the luminance component. FIG. 10 is a hard copy of a picture displayed on a CRT display unit. When FIG. 10 is compared with the original color picture, it can be ascertained that a correct edge detection has been carried out in FIG. 10.

We claim:

1. A color picture image processing system for separating a color picture image into pixel data, transmitting vector signals constituting chrominance components of the pixel data in a corresponding relationship with a transmission of scalar signals corresponding to luminance components of the pixel data, and reproducing the color picture image from said transmitted vector signals and scalar signals, said system comprising:

separation processing means for separating the color picture image into luminance components and chrominance components in correspondence with the pixel data, for separating the separated chrominance components into vector potential components based on a rotation operation on the chrominance components and scalar potential components based on a divergence operation on the chrominance components, and for providing each of said separated components as outputs, coding processing means operating in response to the outputs of said separation processing means for coding the luminance components and the chrominance components based on a coding of all of the scalar potential components, and synthesis processing means operating in response to the coded luminance components and the coded chrominance components for synthesizing the color picture image.

2. A color picture image processing system for separating a color picture image into pixel data, transmitting vector signals constituting chrominance components of the pixel data in a corresponding relationship with a transmission of scalar signals corresponding to luminance components of the pixel data, and reproducing the color picture image from said transmitted vector signals and scalar signals, said system comprising:

separation processing means for separating the color picture image into luminance components and chrominance components in correspondence with the pixel data, for separating the chrominance components into vector potential components based on a rotation operation on the chrominance components and scalar potential components based on a divergence operation on the chrominance components, and for providing each of said separated components as outputs, coding processing means operating in response to the outputs of said separation processing means for generating coded luminance information corresponding to the luminance component and coded chrominance information based on the coding of all of the vector potential components and the scalar potential components, and synthesis processing means operating in response to the coded luminance information and the coded chrominance information for synthesizing the color picture image.

3. A color picture image processing system with edge detection for separating a color picture image into pixel data, transmitting vector signals constituting chrominance components of the pixel data in corresponding relationship with a transmission of scalar signals corresponding to luminance components of the pixel data, and reproducing the color picture image from said transmitted vector signals and scalar signals, said system comprising:

calculation processing means for separating chrominance components of the pixel data into lamellar components and vortex components, lamellar vector analysis connecting means for generating divergence components representing the lamellar components separated in said calculation processing means in the form of a differentiation and for providing first edge formation information, vortex vector analysis connecting means for generating rotation components representing the vortex components separated in said calculation processing means in the form of a differentiation and for providing second edge formation information, and edge extracting means for comparing at least one of the first edge formation information and the second edge formation information with a predetermined value and so as to detect an edge of said color picture image based on the result of said comparison.

4. A system according to claim 3, further comprising luminance edge extracting means for detecting an edge of said color picture image based on luminance components of the pixel data, so that detection of an edge of said color picture image is performed based on the edge detected by said edge extracting means and the edge detected by said luminance edge extracting means.

* * * * *

UNITED STATES PATENT AND TRADEMARK OFFICE
CERTIFICATE OF CORRECTION

PATENT NO. : 4,908,698

DATED : March 13, 1990

INVENTOR(S) : HAJIME ENOMOTO et al.

It is certified that error appears in the above-identified patent and that said Letters Patent is hereby corrected as shown below:

Col. 4, line 55, "$\eta_y = \partial/\partial y$" should be --$\eta_y = \partial \eta/\partial y$--;
line 56, "$L_{xx}\partial^2$" should be --$L_{xx} = \partial^2$--;
line 57, "$/\partial y^2$" should be --$R/\partial y^2$--.

Col. 5, line 51, "$\eta$" should be --$\eta'$--;
line 54, "a" (first occurrence) should be --<u>a</u>--.

Col. 8, line 3, "$[\xi, \partial]$" should be --$[\xi, \eta]$--.

Col. 11, Equation (2), "$\xi_x \eta_y$" should be --$\xi_x + \eta_y$--;
line 60, "$(\xi_x, \xi_x)$" should be --$(\xi_x, \eta_x)$--;
line 62, "$(\xi_x, \xi_x)$" should be --$(\xi_x, \eta_x)$--;
line 64, "$(\xi_y, \xi_y)$" should be --$(\xi_y, \eta_y)$--.

Signed and Sealed this

Second Day of April, 1991

Attest:

HARRY F. MANBECK, JR.

Attesting Officer     Commissioner of Patents and Trademarks